US008875452B2

(12) United States Patent
Kawai et al.

(10) Patent No.: US 8,875,452 B2
(45) Date of Patent: Nov. 4, 2014

(54) ENERGY DISSIPATING METAL PLATE AND BUILDING STRUCTURE

(75) Inventors: Yoshimichi Kawai, Tokyo (JP); Fuminobu Ozaki, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/703,101

(22) PCT Filed: Jun. 16, 2010

(86) PCT No.: PCT/JP2010/004001
§ 371 (c)(1),
(2), (4) Date: Dec. 10, 2012

(87) PCT Pub. No.: WO2011/158289
PCT Pub. Date: Dec. 22, 2011

(65) Prior Publication Data
US 2013/0074427 A1    Mar. 28, 2013

(51) Int. Cl.
*E04B 1/98* (2006.01)
*F16F 7/12* (2006.01)
*E04B 1/24* (2006.01)
*E04H 9/02* (2006.01)

(52) U.S. Cl.
CPC ........... *E04B 1/98* (2013.01); *E04B 2001/2415* (2013.01); *E04B 2001/2463* (2013.01); *E04B 2001/246* (2013.01); *E04B 2001/2442* (2013.01); *E04H 9/028* (2013.01); *E04H 9/021* (2013.01); *F16F 7/12* (2013.01); *E04B 2001/2454* (2013.01); *E04B 2001/2496* (2013.01)
USPC ........................................... 52/167.1

(58) Field of Classification Search
CPC ............. E04H 9/02; E04H 9/024; E04B 1/18; E04B 1/24; E04B 1/36; E04B 1/98; F16F 15/02
USPC .................. 52/167.1, 167.3, 167.4
See application file for complete search history.

(56) References Cited

U.S. PATENT DOCUMENTS 3,461,636 A * 8/1969 Hern ............................ 52/650.1
6,196,356 B1 * 3/2001 Sneed ............................ 187/408
(Continued)

FOREIGN PATENT DOCUMENTS

CN          1641243         7/2005
CN          101131006       2/2008
(Continued)

OTHER PUBLICATIONS

International Search Report dated Jul. 27, 2010, issued in corresponding PCT Application No. PCT/JP2010/004001.
(Continued)

Primary Examiner — Andrew J Triggs
(74) Attorney, Agent, or Firm — Kenyon & Kenyon LLP

(57) ABSTRACT

A energy dissipating metal plate joins a pair of target members and exhibits energy dissipating performance corresponding to a relative displacement between the target members. The energy dissipating metal plate includes: a first joint part to be joined to one of the target members; a second joint part to be joined to other of the target members; and vibration dissipating parts which are provided on a transmission path of tensile force and compression force between the first joint part and the second joint part, and which have slits. Each of the first joint part and the second joint part is formed in a strip shape substantially parallel to a direction of the relative displacement.

12 Claims, 19 Drawing Sheets

(56) References Cited

U.S. PATENT DOCUMENTS

| | | | |
|---|---|---|---|
| 6,254,698 B1* | 7/2001 | Koo et al. | 148/336 |
| 6,681,538 B1* | 1/2004 | Sarkisian | 52/289 |
| 6,739,099 B2* | 5/2004 | Takeuchi et al. | 52/167.1 |
| 7,497,054 B2* | 3/2009 | Takeuchi et al. | 52/167.1 |
| 7,647,734 B2* | 1/2010 | Sarkisian | 52/167.3 |
| 8,468,775 B2* | 6/2013 | Vaughn | 52/843 |
| 2005/0284041 A1* | 12/2005 | Chen | 52/167.5 |
| 2008/0289267 A1* | 11/2008 | Sarkisian | 52/167.3 |
| 2012/0017523 A1* | 1/2012 | Ozaki et al. | 52/167.1 |
| 2013/0074427 A1* | 3/2013 | Kawai et al. | 52/167.4 |

FOREIGN PATENT DOCUMENTS

| | | |
|---|---|---|
| JP | 07-076951 | 3/1995 |
| JP | 07-158315 | 6/1995 |
| JP | 09-144162 | 6/1997 |
| JP | 10-008553 | 1/1998 |
| JP | 2001-349090 | 12/2001 |
| JP | 2004-092096 | 3/2004 |
| JP | 2006-132144 | 5/2006 |
| JP | 2006-214120 | 8/2006 |
| JP | 2007-205449 | 8/2007 |
| JP | 2008-111332 | 5/2008 |
| JP | 2008-157021 | 7/2008 |
| JP | 2009-275473 | 11/2009 |
| JP | 2010-116973 | 5/2010 |

OTHER PUBLICATIONS

Japanese Office Action dated May 24, 2011, issued in corresponding Japanese Application No. 2009-066184, and an English translation thereof.

Search Report dated Mar. 19, 2014 issued in corresponding Chinese Application No. 201080066021.3 [with English Translation].

* cited by examiner

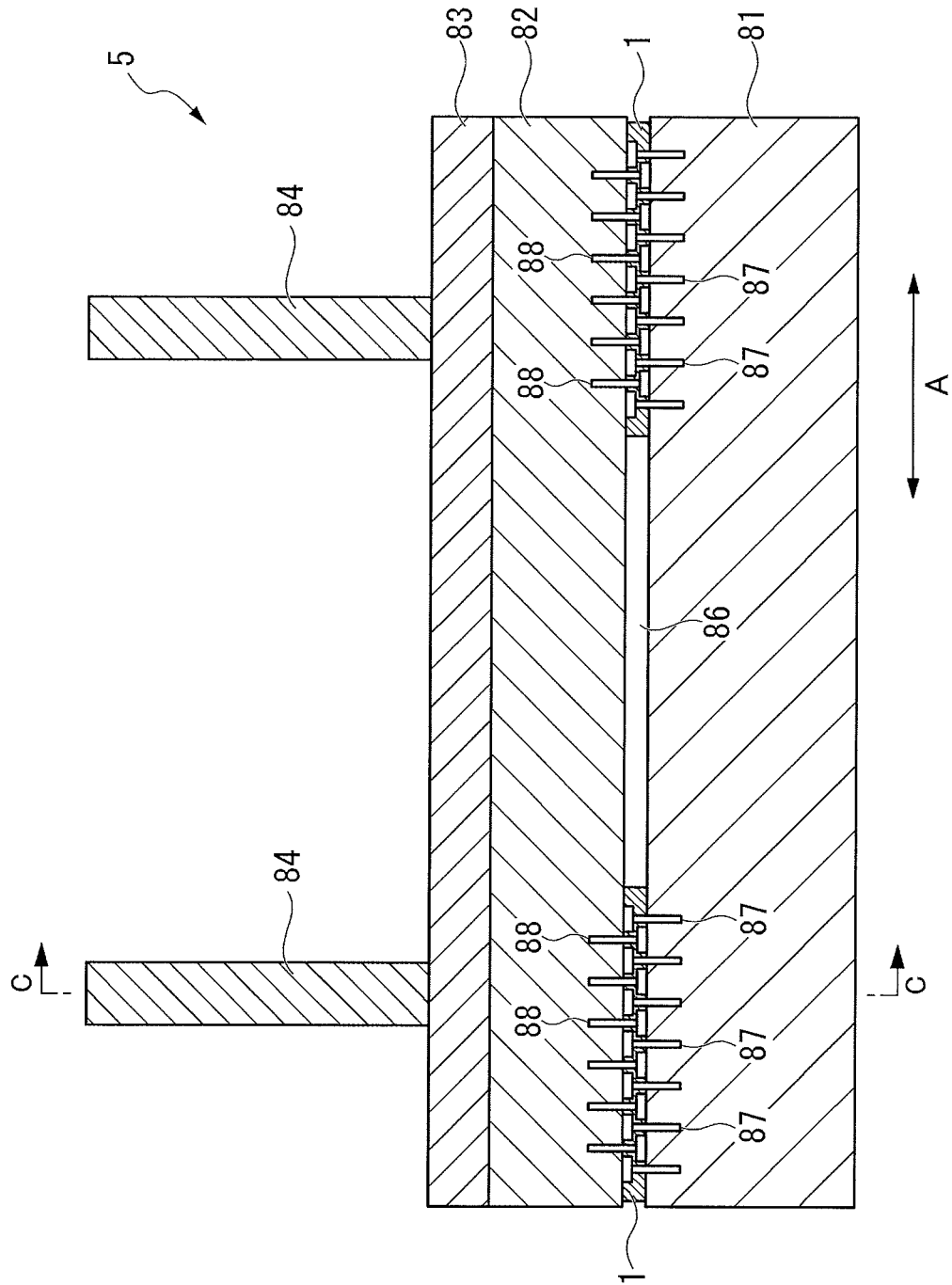

ENERGY DISSIPATING METAL PLATE AND BUILDING STRUCTURE

This application is a national stage application of International Application No. PCT/JP2010/004001, filed Jun. 16, 2010.

TECHNICAL FIELD

The present invention relates to an energy dissipating metal plate which joins a pair of target members and which exhibits energy dissipating performance corresponding to a relative displacement between the target members, and a building structure provided with the energy dissipating metal plates.

BACKGROUND ART

In recent years, in response to increasing awareness about disaster prevention, there are an increasing number of building structures such as houses and apartments that employ a damage control structure for suppressing seismic shocks at a time of an earth quake with use of an energy dissipating fuse. As an example of the energy dissipating fuse used for the type of energy dissipating structure, a number of building structures employ a steel fuse which dissipates vibration energy in the hysteresis due to yielding and plasticizing of a steel material when the steel material is compressed or tensiled, since it exhibits a high level of energy dissipating performance at low cost. Among steel fuses, a buckling restricted brace, which resists axial force, is a most prevailing steel fuse since it has a simple mechanism and can be designed easily. Examples of steel fuses other than the buckling restricted brace include a fuse that uses a base plate and a joint metal.

For example, Patent Document 1 discloses a damage control structure in which a base plate fuse is arranged between a pedestal part of pillar and a foundation portion. When a tensile force acts on the pillar, a flexural yielding or a shear yielding of the base plate occurs. The tensile force occurring in the pedestal part of pillar is dissipated by energy of deformation hysteresis at the time, and an energy dissipating functionality being exhibited.

Moreover, Patent Document 2 discloses a technique such that the fuse steel plate is a shape that flexural-shear-yields so that even if the fuse steel plate receives a cyclic load after having shear-yielded, increase in the shear proof stress thereof can still be suppressed.

Incidentally, in order to improve damage control performance of a building structure part, it is effective to utilize relative displacement between target members for dissipating vibrations. Therefore, other than the above fuse mechanism, it may be considered that with use of relative displacement between a foundation and a continuous footing or between a wall panel layer and a floor panel layer, the fuse is moved to dissipate vibrations and dissipate vibration energy. However, techniques disclosed in Patent Documents 1 and 2 have a problem in that they are not premised to be arranged in an extremely narrow gap such as the gap between the foundation and the continuous footing and/or the gap between the wall panel layer and the floor panel layer, and therefore, vibration energy in the type of narrow place cannot be dissipated.

If a part of a fuse is inserted between the target members that displace relatively to each other, a rigidity of inserted portion of the fuse becomes higher than that of non-inserted portion of the fuse. As a result, while a relative displacement of the part in which the fuse is inserted becomes smaller, a relative displacement of the part in which the fuse is not inserted becomes greater, and therefore, the vibration energy may not be efficiently dissipated in some cases. Therefore, it is important to insert the fuse evenly across the entire portion that would have relative displacement therein.

PRIOR ART DOCUMENTS

Patent Documents

[Patent Document 1] Japanese Unexamined Patent Application, First Publication No. 2004-092096
[Patent Document 2] Japanese Unexamined Patent Application, First Publication No. 2008-111332

DISCLOSURE OF INVENTION

Summary of Invention

Technical Problem

Consequently, the present invention takes into consideration the above problems, with an object of providing: an energy dissipating metal plate which is joined between a pair of target members and which exhibits an energy dissipating performance corresponding to a relative displacement between the target members, wherein, in particular, the energy dissipating metal plate can be arranged in an extremely narrow gap and can be applied to various locations of a building structure; and a building structure which uses the energy dissipating metal plate.

Solution to Problem

In order to solve the above problems and achieve the above object, the present invention employs the following configurations. That is to say:

(1) The energy dissipating metal plate according to the present invention is an energy dissipating metal plate which joins a pair of target members and which exhibits energy dissipating performance corresponding to a relative displacement between the target members, the energy dissipating metal plate including: a first joint part to be joined to one of the target members; a second joint part to be joined to other of the target members; and vibration dissipating parts which are provided on a transmission path of a tensile force and a compression force between the first joint part and the second joint part, and which have slits, wherein each of the first joint part and the second joint part is formed in a strip shape substantially parallel to a direction of the relative displacement.

(2) The energy dissipating metal plate according to (1) may be a single plate to be located between the target members so that a front surface comes in contact with one of the target members while a back surface comes in contact with the other of the target members.

(3) In the energy dissipating metal plate according to (1), the first joint part may be provided in a form of two lines via the vibration dissipating part, in substantially axisymmetric positions centered on the second joint part.

(4) In the energy dissipating metal plate according to (3), a configuration such that: when seen along the direction of the relative displacement, a length of the first joint part is longer than a length of the second joint part; and the end parts of the first joint parts in the form of two lines are joined, may be employed.

(5) In the energy dissipating metal plate according to (1), the energy dissipating metal plate may be precipitation-hardened or trip-processed so that a ratio of yield proof stress to a maximum proof stress is equal to or more than 4/5.

(6) In the energy dissipating metal plate according to (1), at least one of the first joint part and the second joint part may be reinforced along the direction of the relative displacement by a reinforcement member.

(7) In the energy dissipating metal plate according to (1), a configuration such that: a first insertion hole into which a first fastener that joins the first joint part to the one of the target members is inserted is formed in the first joint part, while a second insertion hole into which a second fastener that joins the second joint part to the other of the target member is inserted is formed in the second joint part; and at least one of the first insertion hole and the second insertion hole is a long hole which extends in a direction substantially orthogonal to the direction of the relative displacement, may be employed.

(8) In the energy dissipating metal plate according to (1), a configuration such that: a pair of the vibration dissipating parts are provided adjacent to both sides of the second joint part; a pair of the first joint parts are further provided adjacent to the outer side of the vibration dissipating parts; and the transmission path is a path that connects the first joint part and the second joint part via the vibration dissipating parts, may be employed.

(9) In the energy dissipating metal plate according to (1), a configuration such that: a pair of the vibration dissipating parts are provided adjacent to both sides of the second joint part; a pair of extension parts that extend from the outer side of the vibration dissipating parts along the direction of the relative displacement are further provided; the first joint part is provided so as to be continuous with the extension parts; and the transmission path is a path that connects the second joint part, the vibration dissipating parts, the extension parts, and the first joint part, may be employed.

(10) The building structure according to the present invention is provided with the energy dissipating metal plate according to any one of (1) to (9) above.

(11) In the building structure according to (10), a configuration such that: the building structure further includes a continuous footing and a foundation of a building upper frame; and in a state where the energy dissipating metal plate is located between the continuous footing and the foundation, the first joint part is joined to either one of the continuous footing and the foundation, and the second joint part is joined to the other of the continuous footing and the foundation, may be employed.

(12) In the building structure according to (10), a configuration such that: the building structure further includes a wall frame and a beam of a floor; and while the second joint part is joined to the wall frame, the first joint part is joined to the beam, may be employed.

(13) In the building structure according to (10), a configuration such that the building structure further includes an energy dissipating fuse which is arranged within a section formed by a plurality of steel pipe pillars and which has a plurality of braces; and the energy dissipating metal plate is provided at least one of a joint location between the steel pipe pillars and the braces and the joint location between the braces, may be employed.

Advantageous Effects of Invention

According to the energy dissipating metal plate according to (1), it is provided on the transmission path of tensile force and compression force between the first joint part and the second joint part and the vibration dissipating parts having the slits is flexurally yielded to be plastically deformed in early, and thereby, it is possible to exhibit stable deformation energy dissipating performance with an increase in proof stress being suppressed. By making the energy dissipating metal plate exhibit the energy dissipating performance corresponding to the relative displacement between the target members, the damage control function can be effectively exhibited in the building structure in which the energy dissipating metal plate is arranged.

In particular, in the present invention, as described in (2), in the case where it is the single plate to be located between the target members, it can be installed in a narrow gap into which it could not be inserted up until now, and further, it can be applied to various locations of the building structure.

Moreover, in the present invention, in the case where the length of the vibration dissipating part in the direction orthogonal to a direction of the relative displacement is made longer than a predetermined dimension, bending moment, which occurs to both ends of the energy dissipating metal plate, can be made greater, and it is possible to easily make the vibration dissipating part yield flexurally. On the other hand, in the case where the length of the vibration dissipating part in the direction orthogonal to the direction of the relative displacement is made shorter than the predetermined dimension, the vibration dissipating part is yielded with the shearing force that occurs in the vibration dissipating part. Ideally, it is preferable that the shape of slit hole is a substantially rhombic shape so that a flexural yielding or a shear yielding of the vibration dissipating part occurs.

Furthermore, in the case where precipitation-hardening or TRIP processing (processing a metal plate having transformation-induced plasticity) is performed so that the ratio of the yield proof stress to the maximum proof stress is equal to or more than 4/5 as with the energy dissipating metal plate described in (5), plastic deformation due to flexural yielding and shear yielding can be easily made to occur over a wide range in the vibration dissipating part. As a result, it is possible to reliably obtain the effect of the present invention described above.

According to the building structure described in (10), it is possible, by providing the energy dissipating metal plate described in (1), to increase the level of damage control performance thereof.

BRIEF DESCRIPTION OF THE DRAWINGS

FIG. 5 is a vertical sectional view of a portion of a building structure according to the embodiment, spanning from the continuous footing to the foundation of the building. In the figure, in order to show the relative position relationship between the fasteners, the fasteners that are actually separately-displaced in the page surface depth direction are also shown on the sectional plane.

DESCRIPTION OF EMBODIMENTS

Hereunder, as an embodiment of the present invention, an energy dissipating metal plate which joins a pair of target members and which exhibits energy dissipating performance corresponding to the relative displacement between the target members, is described in detail, with reference to figures.

Figure 1:
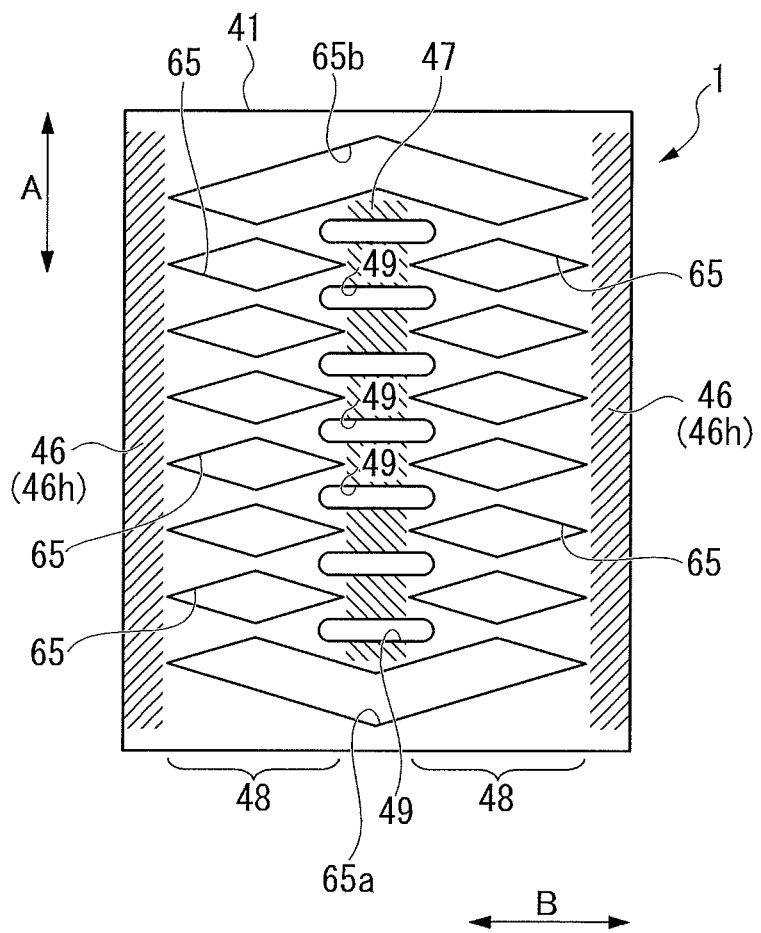
FIG. 1 is a front view showing an embodiment of an energy dissipating metal plate of the present invention.

A configuration of an energy dissipating metal plate 1 of the present embodiment is shown in FIG. 1. The energy dissipating metal plate 1 is such that in a single metal plate 41 serving as a base, there are formed slits 65 (insertion holes) of a predetermined shape, and there are allocated joint parts 46 and 47 to be attached to the target members. It is assumed that the energy dissipating metal plate 1 joins a pair of the target members. The target members of the present embodiment are one of the constituents of a building structure. However, the energy dissipating metal plate 1 of the present embodiment may be applied to a joint for other purposes also.

Figure 2A:
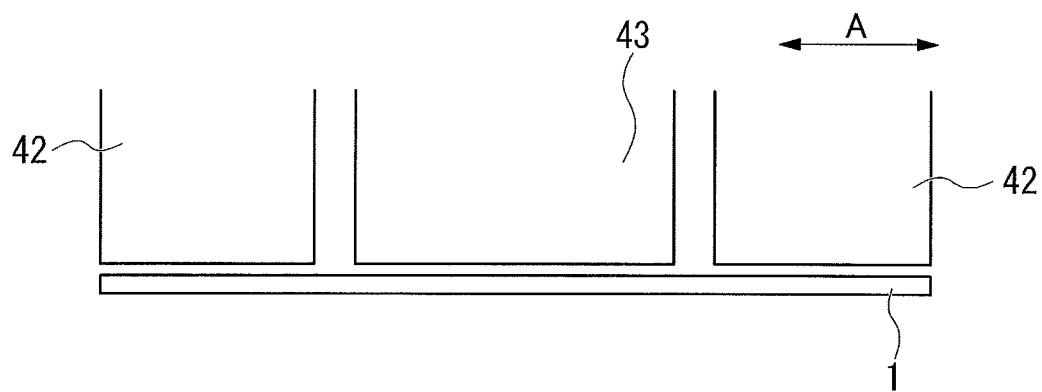
FIG. 2A is a side view showing an attachment example of the energy dissipating metal plate.
Figure 2B:
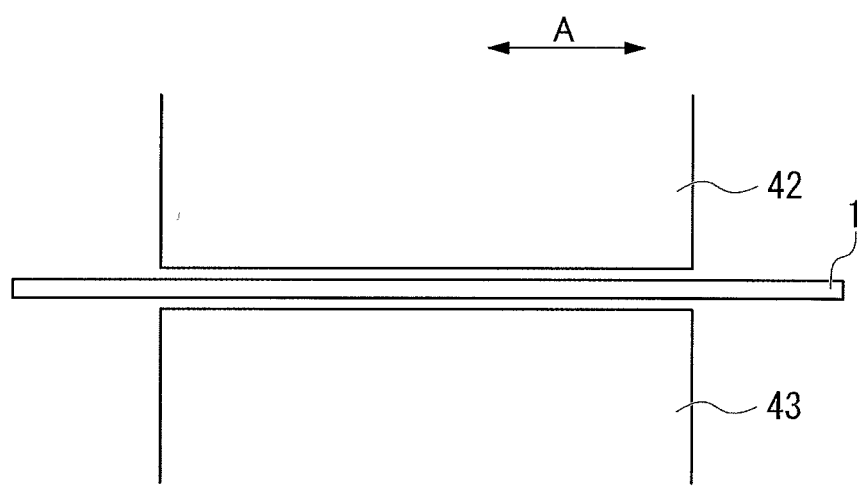
FIG. 2B is a side view showing another attachment example of the energy dissipating metal plate.

The target members of the present embodiment may be such that, as shown in the side view of FIG. 2A, both of one target member 42 and the other target member 43 are positioned on one face side with respect to the energy dissipating metal plate 1, or as shown in the side view of FIG. 2B, the one target member 42 and the other target member 43 are positioned on both face sides so as to sandwich the energy dissipating metal plate 1 therebetween.

In both cases, the one target member 42 and the other target member 43 are displaced relatively to each other along a relative displacement direction A in the event of an earthquake, etc. The energy dissipating metal plate 1 is attached on the face of one target member 42 and on the face of the other target member 43, which are relatively displaced along such a relative displacement direction A. The energy dissipating metal plate 1 exhibits the energy dissipating performance corresponding to the relative displacement caused by vibration along the direction of the relative displacement A between both of the target members 42 and 43.

Returning to description of FIG. 1, the energy dissipating metal plate 1 to be attached to the pair of the target members 42 and 43 is such that a pair of first joint parts 46 to be joined with the one target member 42 and a second joint part 47 to be joined with the other target member 43 are respectively allocated substantially parallel with each other in a long strip form along the direction of the relative displacement A, on the single metal plate 41. Between the first joint parts 46 and the second joint part 47, there is respectively formed a damping part 48 (vibration dissipating part) for suppressing an increase in a proof stress after yielding.

The first joint parts 46 are formed so that a plurality of circular holes 46h are arranged in a form of line and the first joint parts 46 are allocated in two lines in positions substantially line-symmetric with each other about the second joint part 47. That is to say, the first joint parts 46 are allocated at both ends along a substantially orthogonal direction B, which is substantially orthogonal to the direction of the relative displacement A. The second joint part 47 is positioned at the center of the joint parts 46. Since the first joint parts 46 are arranged via the damping parts 48 with respect to the second joint part 47, the damping parts 48 are also allocated at the positions substantially line-symmetric with each other about the second joint part 47.

The first joint parts 46 are regions for being joined to the target member 42 with fasteners (fastening members such as bolts, drill screws, screws, and nails). The first joint parts 46 are not limited to specific configurations such as fastener insertion holes, and they may be pre-allocated planar regions where fasteners are absolutely scheduled to be fixed thereon when being attached to the target member 42. That is to say, in the case where the drill screws or the nails capable of fixing the first joint part 46 with their sharp tip end by passing therethrough in the plate thickness direction thereof to the target member 42 are employed as fasteners, it is not necessary to pre-form the fastener insertion holes in the first joint part 46. In the case, the flat region for the drill screws or the nails, which serve as fasteners, to pass therethrough serves as the first joint part 46, and by boring the flat region with fasteners, it is possible to form the fastener insertion holes and attach the fasteners simultaneously.

Moreover, in the case where the first joint parts 46 are assumed to be joined by screwing the fasteners into the target member 42, the first joint parts 46 may be configured as insertion holes for inserting the fastener. In either case, the first joint parts 46 are allocated so as to be vertically long along the direction of the relative displacement A (in other words, so as to be formed in a strip shape along the direction of the relative displacement A). In reality, the direction of the relative displacement A is determined according to the arrangements of the target members 42 and 43 to be attached. In a state in which the extending direction of the strip shape formed by the first joint part 46, which is preliminarily allocated in a strip foam, is positioned so as to align with the direction of the relative displacement A of the target members 42 and 43, the energy dissipating metal plate 1 is attached to the target members 42 and 43.

The second joint part 47 is a region for being joined to the target member 43 with the fasteners (the fastening members such as the bolts, the drill screws, the screws, and the nails). The second joint part 47 is configured with a plurality of fastener insertion holes 49 that pass through the metal plate 41 with the major axis thereof being along the above B direction.

Meanwhile, the second joint part 47 is not limited to the above case of being configured with the long circular fastener insertion holes 49, and may be configured with normal circular fastener insertion holes 49. Moreover, the second joint part 47 is not limited to specific configurations such as the fastener insertion holes 49, and may be pre-allocated planar regions where the fasteners are absolutely scheduled to be fixed thereon when being attached to the target member 43. The point is the same as the description of the first joint part 46, and therefore, the description of this is omitted here. In either case, the second joint part 47 is allocated so as to be vertically long toward the direction of the relative displacement A (in other words, so as to be formed in a strip shape along the direction of the relative displacement A). For example, if the fastener insertion holes 49 are formed at a plurality of locations at predetermined intervals along the direction of the relative displacement A, the second joint part 47 is embodied as a mode where it is allocated in a strip shape in the direction of the relative displacement A.

The damping parts 48 of two lines are each configured as lines of a plurality of slits 65. The slits 65 are such that several of them are at least formed in a line form at predetermined intervals along the direction of the relative displacement A. Meanwhile, the arrangement intervals of the slits 65 are not limited to the case of being regular intervals, and they may be random intervals.

The slits 65 may be any shape. However, it is preferably a shape with a major axis being along the direction B. Moreover, although FIG. 1 shows, as an example, a case of the configuration with rhombus-shaped slits 65, it is not limited to the shape, and it may be configured with a rectangular shape, another polygonal shape, or an indeterminate shape.

By providing the type of slits 65 in the damping part 48, the yield strength of at least the damping part 48 can be made lower than that of other locations. Incidentally, among the slits 65 of two-lines, the slits 65 positioned at both ends of the direction of the relative displacement A are configured to be connected with each other and as being slits 65a and 65b with a major axis thereof being along the B direction.

Next, an operation of the energy dissipating metal plate 1 is described. In the energy dissipating metal plate 1 configured as described above, while the first joint parts 46 are attached to the target member 42 with the fasteners (not shown in figure), the second joint part 47 is attached to the target member 43 with the fasteners (not shown in figure). In a case where a force caused by earthquake or the like acts on the building structure, the target members 42 and 43 are displaced relatively to each other along the direction of the relative displacement A. When vibration occurs in the direction of the relative displacement A, momentarily, for example as shown in FIG. 3A, the target member 42 is displaced in the a1 direction and the target member 43 is displaced in the a2 direction.

At this time, the first joint part 46 attached to the target member 42 is also displaced in the a1 direction. On the other hand, the second joint part 47 attached to the target member 43 is displaced in the a2 direction. As a result, in the first joint part 46, stress $\sigma_E$ is transmitted in the direction shown with the small arrows in FIG. 3A. In each process of the stress $\sigma_E$ being transmitted, at positions where the slits 65 are formed, a compression stress from the slit 65 adjacent to one side thereof is transmitted, and a tensile stress is transmitted toward the position where the slit 65 adjacent to the other side thereof is formed. Consequently, the each moment is cancelled. In this way, the stress $\sigma_E$ is sequentially transmitted and the compression force is eventually transmitted to the slit 65a side.

Figure 3A:
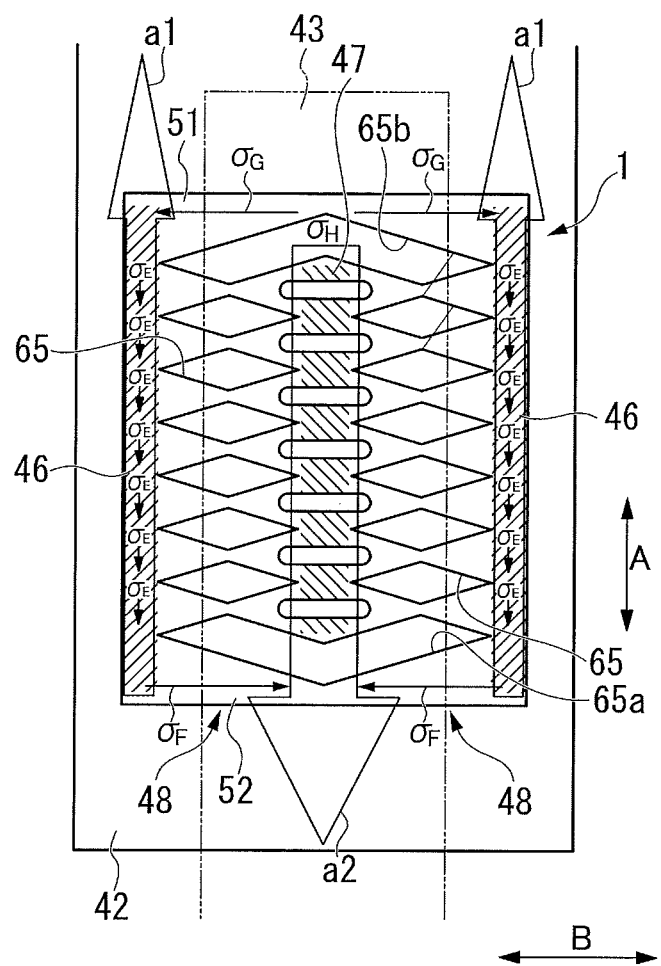
FIG. 3A is a front view for describing an operation of the energy dissipating metal plate.

As a result, at the lower end part 52 of the energy dissipating metal plate 1, the two-lines of first joint parts 46 attempt to move away from each other along the B direction, and as shown in FIG. 3A, stress $\sigma_F$ for suppressing it is transmitted along the B direction and in the direction opposing to each other. Since the stress $\sigma_F$ is transmitted from the end parts of the two-lines of first joint parts 46 in the directions opposing to each other, they offset each other just at the substantially center of the lower end part 52. Moreover, also in the upper end part 51, similarly, stress $\sigma_G$ is loaded in directions opposing to each other along the B direction, and therefore, they are cancelled by each other.

That is to say, in the case where the target members 42 and 43 are relatively displaced from each other along the direction of the relative displacement A, the energy dissipating metal plate 1 can still offset the stress $\sigma_E$ and stress $\sigma_F$ within the energy dissipating metal plate 1 even if the stress $\sigma_E$ and the stress $\sigma_F$ based on the relative displacement are transmitted. Furthermore, also in the case where the target member 42 shifts in the a2 direction of FIG. 3A and the target member 43 is displaced in the a1 direction, when observing momentarily, the direction of the arrows of the stress vectors mentioned above is simply reversed from the direction shown in FIG. 3A, and as expected, the stress can offset each other within the energy dissipating metal plate 1.

Moreover, stress $\sigma_H$ is loaded on the second joint part 47 of the energy dissipating metal plate 1 according to the displacement of the target member 43. As a result, as shown in FIG. 3A, shear stress occurs between the stress on loaded on the first joint part 46 and the stress $\sigma_H$ loaded on the second joint part 47. Furthermore, bending moment based on the shear deformation is loaded on the damping parts 48, which serve as the joint parts between the first joint parts 46 and the second joint part 47. When the bending moment becomes greater than a predetermined value, the damping parts 48 flexurally yields. In addition, in damping parts 48, with the shape of the slit 65 made oval with the major axis being along the B direction, the damping parts 48 can be set to flexurally yield along the direction of the relative displacement A according to the relative displacement between the target members 42 and 43. As a result, in the present embodiment, it is possible to realize the specific effect described below.

Figure 3B:
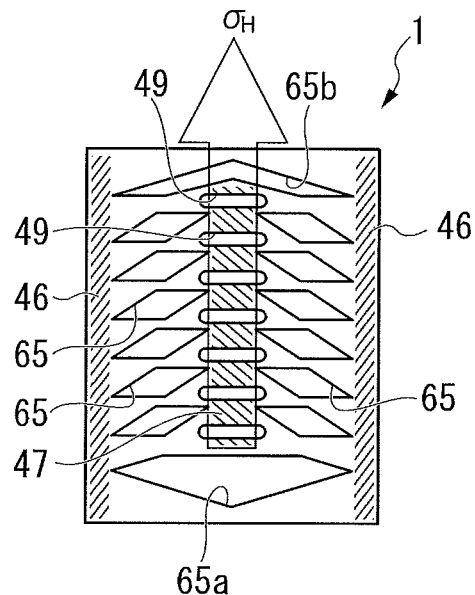
FIG. 3B is a front view for describing an operation of the energy dissipating metal plate.
Figure 3C:
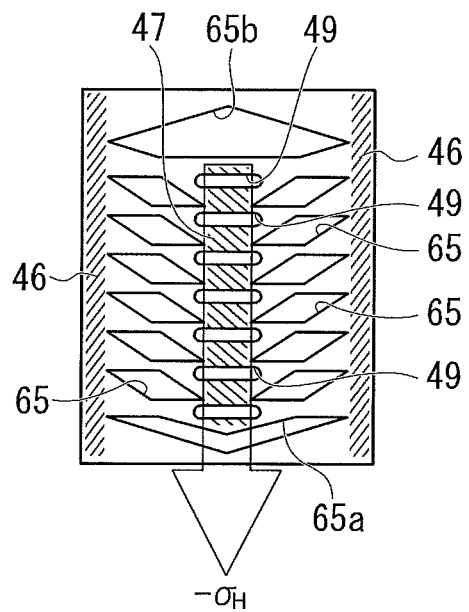
FIG. 3C is a front view for describing an operation of the energy dissipating metal plate.

FIG. 3B shows a case where the stress $\sigma_H$ is loaded as a result of the displacement of the target member 43 with the first joint parts 46 being fixed ends. Moreover, FIG. 3C shows a case where stress is loaded as a result of the displacement of the target member 43 with the first joint parts 46 being fixed ends. The second joint part 47 deforms upward in the figure in the case of FIG. 3B, and it deforms downward in the figure in the case of FIG. 3C. That is to say, the position of the second joint part 47 is displaced relatively to the first joint parts 46, and the shape of the slits 65, 65a, and 65b also deforms upwardly/downwardly according to the displacement. When the type of cyclic displacement occurs in the upward/downward directions of the second joint part 47, the damping parts 48 flexurally yields, and the energy dissipating metal plate 1 is plasticized to perform energy dissipating. Also in the case, the stress $\sigma_F$ and the stress $\sigma_G$ are offset with the above mechanism at both of the upper end part 51 and the lower end part 52.

Figure 4A:
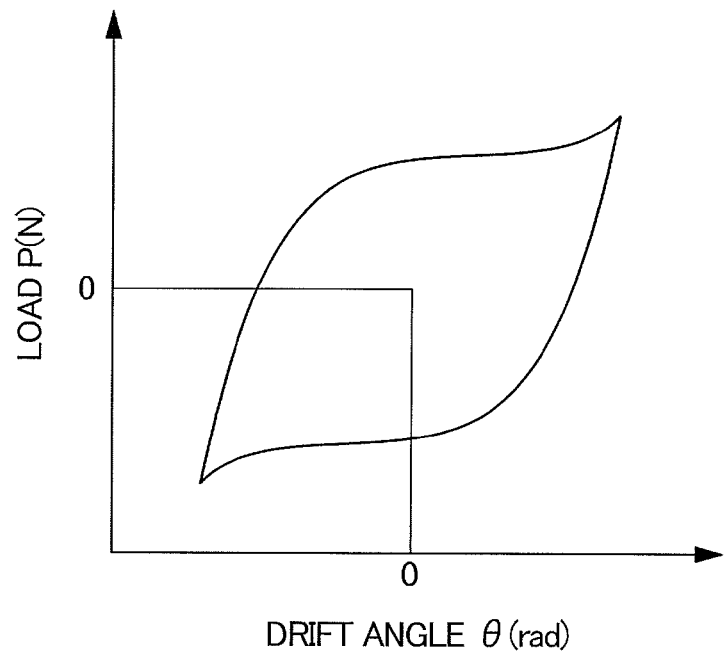
FIG. 4A is a graph showing the results of a cyclic load test in a case where the major axis of the slits of the energy dissipating metal plate is made long in the B direction indicated in FIG. 3A.
Figure 4B:
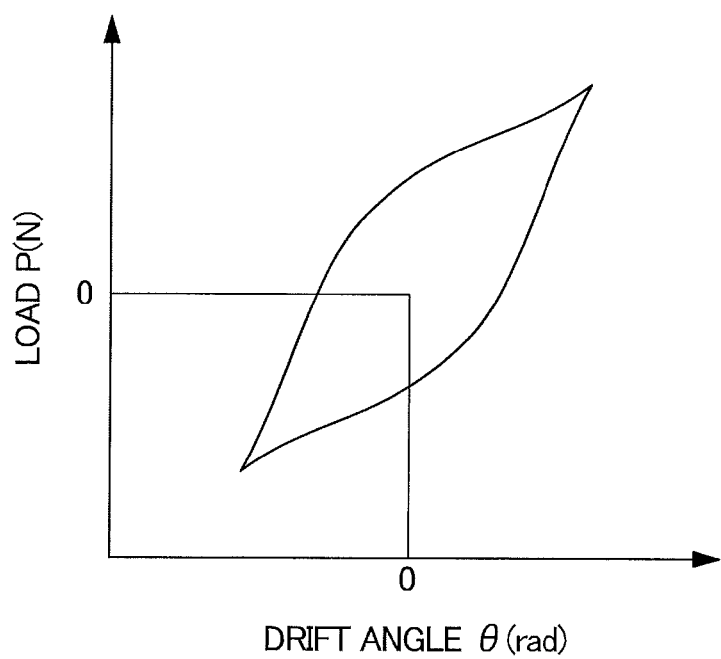
FIG. 4B is a graph showing the results of a cyclic load test with an energy dissipating metal plate of a comparative example.

FIG. 4A shows the results of a cyclic load test with use of the energy dissipating metal plate 1 of the present embodiment in which the slits 65 has a major axis which is along the B direction indicated in FIG. 3A, and FIG. 4B shows the results of cyclic load test of a steel plate prepared as a comparative example. Incidentally, in the steel plate of the comparative example, although the same material as that of the energy dissipating metal plate 1 is used, there is no slit 65 provided therein, and in addition, a rib is provided at the upper and lower end edges of the steel plate so that it would not flexurally yield.

It can be understood from FIG. 4A that in the energy dissipating metal plate 1 of the present embodiment, an increase in the proof stress is suppressed, a hysteresis loop with a great area is drawn, and a high level of hysteresis dissipation can be obtained. In contrast, in the comparative example of FIG. 4B, it can be understood that the proof stress increases.

Based on this, in the energy dissipating metal plate 1 of the present embodiment, by making the damping parts 48 flexurally yield early, it is possible to cause plastic deformation to occur, and thereby stable deformation energy dissipating performance can be exhibited while an increase in the proof stress is suppressed. By having the energy dissipating metal plate 1 exhibit energy dissipating performance corresponding to the relative displacement between the target members 42 and 43, it is possible to have the building structure with the energy dissipating metal plate 1 arranged therein exhibit a damage control function.

Furthermore, in the present embodiment, as the metal plate 41 that configures the energy dissipating metal plate 1, there may be used a steel plate that has been precipitation-hardened or trip-processed so that a ratio of yield proof stress, which is a ratio of yield proof stress to maximum proof stress, is equal to or more than 4/5. In this case, the plastic deformation region due to the flexural yielding can be expanded in the damping parts 48 without providing the slits 65, and it is possible to realize the effected described above.

Meanwhile, only the fastener insertion holes 49 of the second joint part 47 were provided as long holes. However, it is not limited to the configuration, and only the fastener insertion holes in the first joint parts 46, or the fastener insertion holes in both of the first joint parts 46 and the second joint part 47 may be provided as long holes that are long along the substantially orthogonal direction B. In this case, unwanted stress would not occur in the damping parts 48, which serves as a vibration dissipating part, when the target members 42 and 43 shift relatively along the substantially orthogonal direction B.

Example 1

Figure 6:
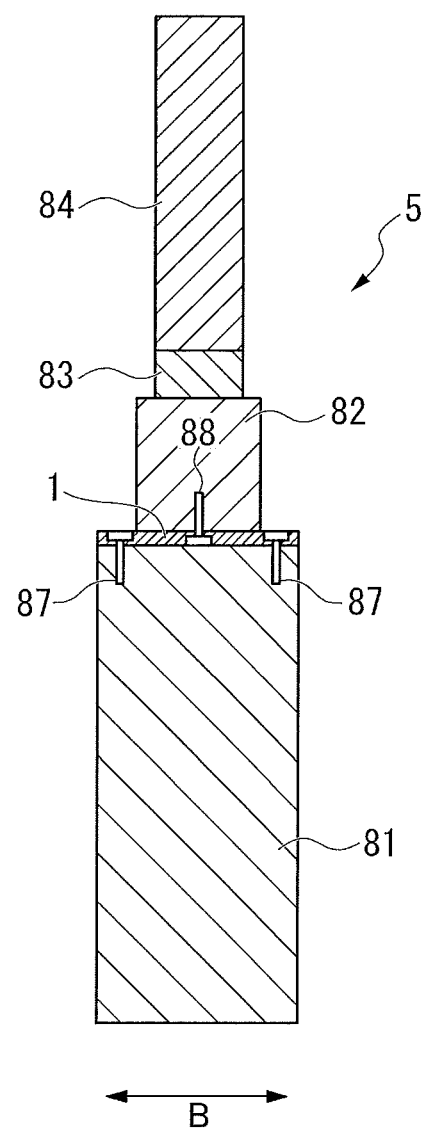
FIG. 6 is a C-C sectional view of FIG. 5. In the figure, in order to show the relative position relationship between the fasteners, the fasteners that are actually separately-displaced in the page surface depth direction are also shown on the sectional plane.
Figure 7:
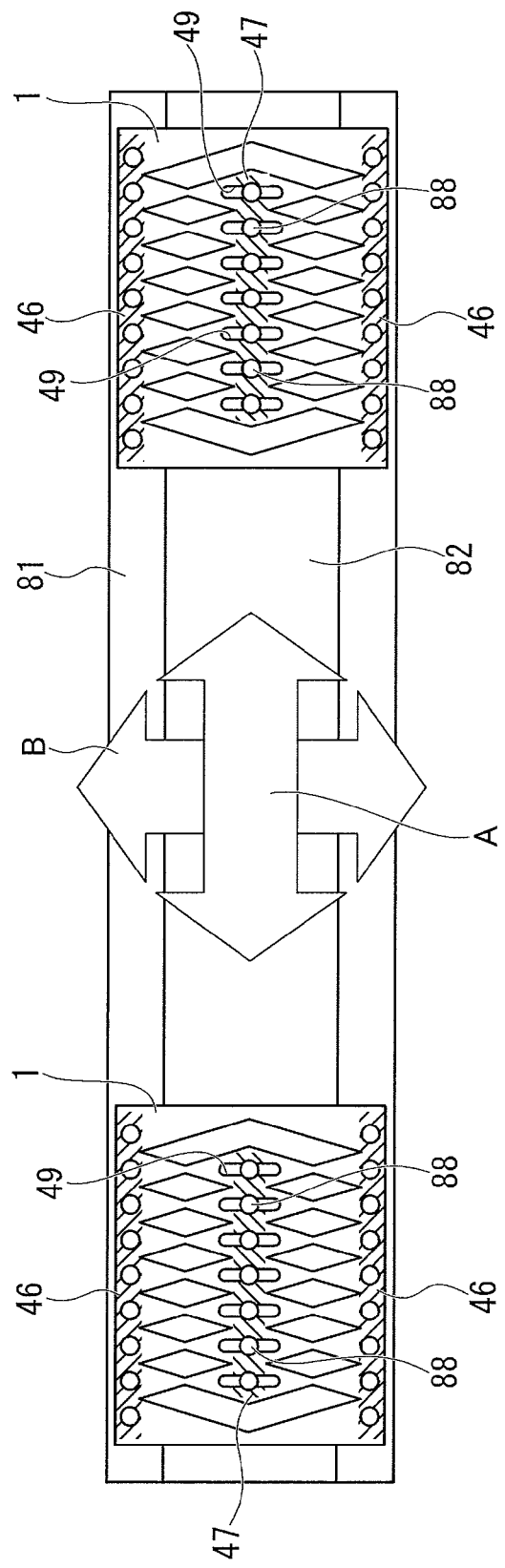
FIG. 7 is a figure for describing the operational advantage of the energy dissipating metal plate of the present embodiment.

FIG. 5 is a figure showing Example 1 of the present invention, showing an example of a building structure 5 having the above energy dissipating metal plate 1 arranged therein. To describe in more detail, an enlarged view of a vertical sectional configuration in the building structure 5 spanning from a continuous footing 81 to a foundation 82 of the building structure 5 is shown. Moreover, FIG. 6 shows a C-C sectional view of FIG. 5. Furthermore, FIG. 7 shows a specific mode where the energy dissipating metal plate 1 is arranged in the building structure 5.

The building structure 5 of the Example 1 is provided with the continuous footing 81 and the foundation 82 arranged on the continuous footing 81. Furthermore, a horizontal frame 83 which extends in the horizontal direction and vertical frames 84 which extend in the perpendicular direction are attached on the foundation 82. Moreover, between the continuous footing 81 and the foundation 82, a gap with a predetermined dimension serving as a ventilation hole 86 is formed. In the Example 1, in the ventilation hole 86, the energy dissipating metal plate 1 described above is installed.

As shown in FIG. 5 and FIG. 6, first joint parts 46 of the energy dissipating metal plate 1 is fixed to the continuous footing 81 with concrete nails 87 (fasteners). Moreover, the second joint part 47 is fixed to the foundation 82 with screws 88 (fasteners). As shown in FIG. 7, the second joint part 47 is fixed to the foundation 82 by screwing the screws 88, which are inserted into the screw holes 49 (fastener insertion holes) with a major axis thereof being along the substantially orthogonal direction B, into a lower face of the foundation 82.

That is to say, in the Example 1, the target member 42 to be joined with the joint parts 46 serves as the continuous footing 81, and the target member 43 to be joined with the second joint part 47 serves as the foundation 82.

As shown in FIG. 7, in the case where the building structure 5 vibrates along the direction of the relative displacement A, it is possible to exhibit the damage control effect described above. That is to say, in the case where load caused by a small to moderate earthquake or wind is loaded on the building structure 5, the energy dissipating metal plate 1 can function as a highly rigid joint metal member. As a result, without plastically deforming the energy dissipating metal plate 1, it is possible to exhibit resistive force within a range of the elastic deformation range thereof. Moreover, if a large earthquake occurs, the damping parts 48 (vibration dissipating parts) receive a cyclic load of tensile stress and compression stress as described above and are plasticized, and thereby, it is possible to exhibit the damping effect.

In contrast, if vibration occurs along the substantially orthogonal direction B, the energy dissipating metal plate 1 does not exhibit the damping effect described above. The reason for this is that since it is screwed on the foundation 82 with the screws 88 being inserted into the screw holes (long holes) 49 having a major axis being along the substantially orthogonal direction B, the screws 88 simply reciprocate within the screw holes 49 along the major axis direction thereof as a result of vibration in the substantially orthogonal direction B, and no particular deformation suppression function is exhibited. As a result, if the vibration along the substantially orthogonal direction B occurs, the foundation 82 also vibrates together along the substantially orthogonal direction B on the energy dissipating metal plate 1.

Figure 8:
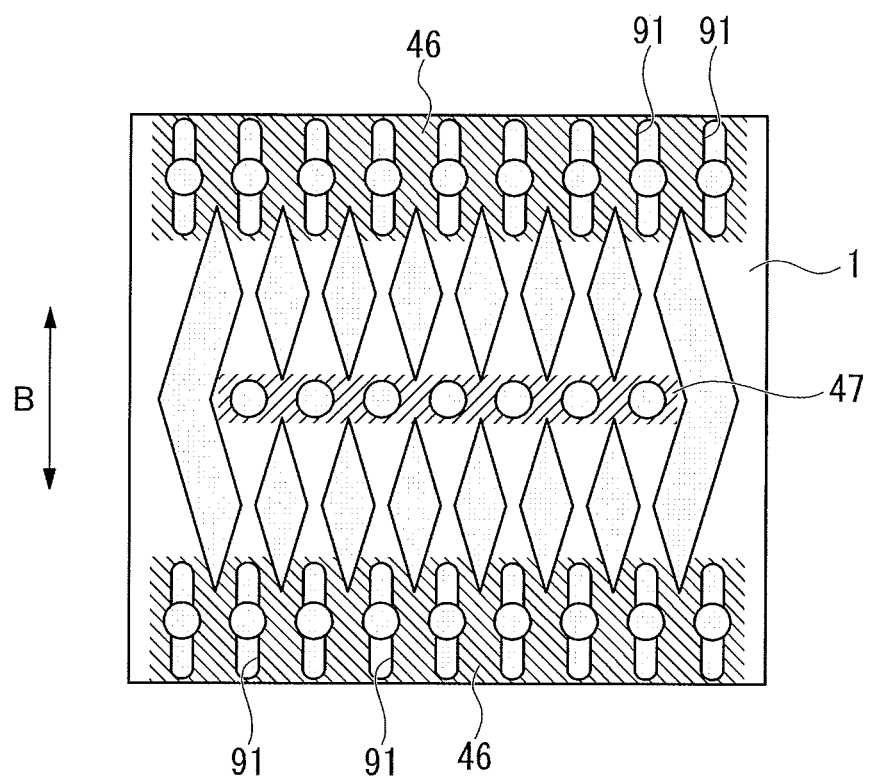
FIG. 8 is a figure showing a modified example of the energy dissipating metal plate, being a front view showing a case where the insertion hole of fastener on the first joint part side is lengthened in the B direction.

Meanwhile, as shown in the modified example of FIG. 8, screw holes 91 with the major axis thereof being along the substantially orthogonal direction B may be bored on the first joint parts 46 sides, while normal circular screw holes 92 may be bored on the second joint part 47. Also with the configuration, it is possible to obtain an effect similar to that of the configuration described above. Furthermore, although it is not shown in the figure, the screw holes of first joint parts 46 and the screw holes of the second joint parts 47 may both be provided as screw holes with the major axis thereof being along the substantially orthogonal direction B. Also in the case, it is possible to obtain an effect similar to that of the configuration described above.

Moreover, in the Example 1, the energy dissipating metal plate 1 may serve also as a spacer in the ventilation hole 86.

Example 2

Figure 9A:
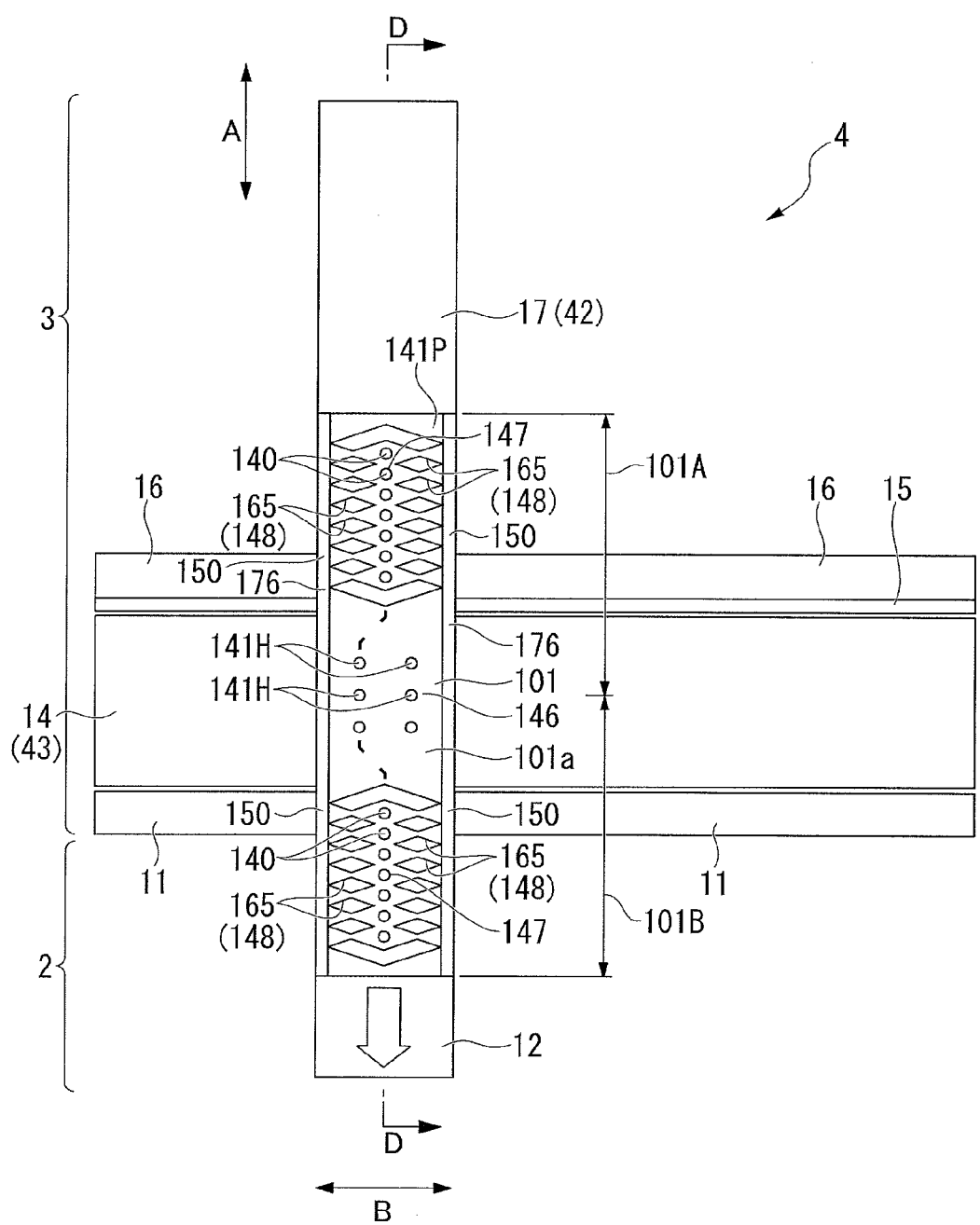
FIG. 9A is a front view showing an example of a building structure in which the energy dissipating metal plate of the present embodiment is arranged.
Figure 9B:
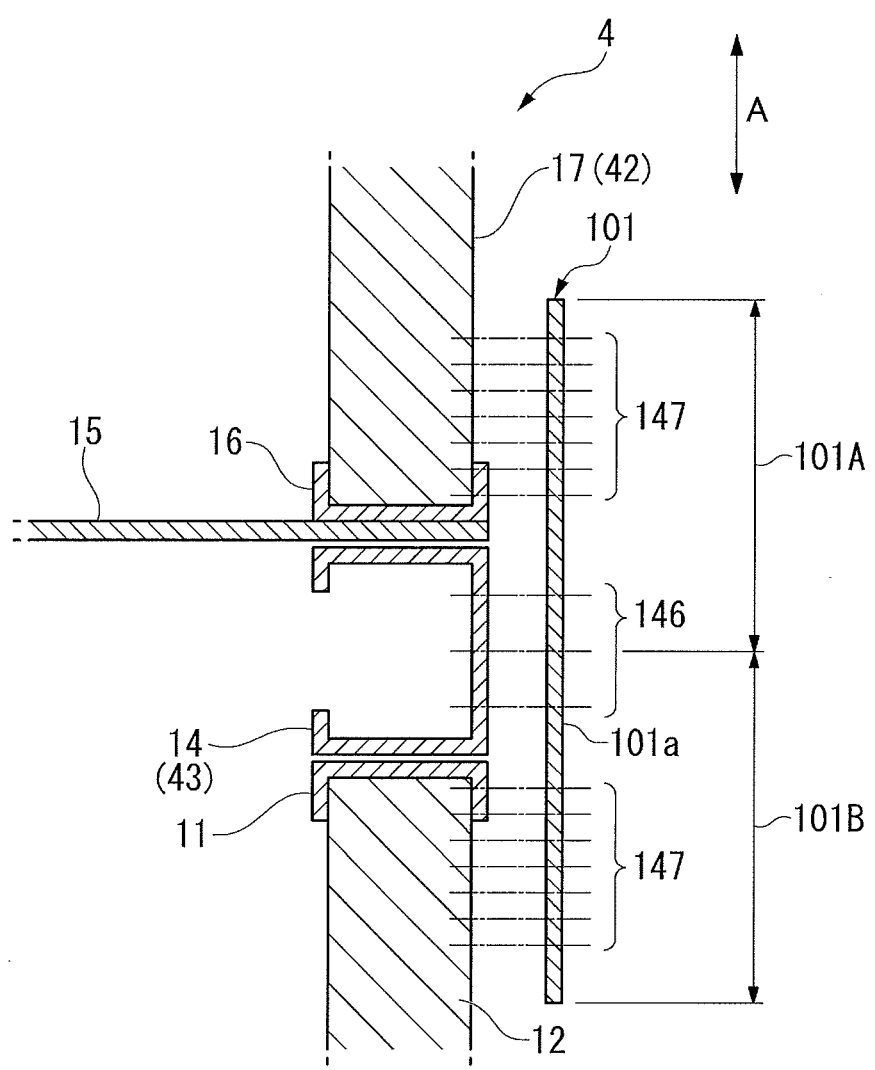
FIG. 9B is a D-D sectional view of FIG. 9A.

FIG. 9A and FIG. 9B are figures showing Example 2 of the present invention, showing an example of a building structure 4 in which an energy dissipating metal plate 101 applied with the present invention is arranged. To describe it in more detail, the figure shows an enlarged view of a vertical sectional configuration in the building structure 4 spanning from a lower level 2 to an upper level 3.

In the building structure 4, on the lower level 2 side, there are provided a lower level horizontal frame 11 that extends in the horizontal direction, and a lower level vertical frame 12 that extends along the perpendicular direction. The lower level horizontal frame 11 and the lower level vertical frame 12 are joined with each other via a floor joist 14 or the like arranged therebetween. Moreover, on an upper face of the lower level horizontal frame 11, the floor joist 14 of the upper level 3 is joined, and further, on an upper face of the floor joist 14, a floor plate 15 of the upper level 3 is attached.

Furthermore, in the building structure 4, on the upper level 3 side, there are provided an upper level horizontal frame 16 that extends in the horizontal direction and an upper level vertical frame 17 that extends in the perpendicular direction, and the upper level horizontal frame 16 and the upper level vertical frame 17 are joined with each other.

In the building structure 4 having the above configuration, an energy dissipating metal plate 101 applied with the present invention is used. The energy dissipating metal plate 101 is such that, above and below the center position of a metal plate 141P in the direction of the relative displacement A, second joint parts 147 for joining to the upper level vertical frame 17 and the lower level vertical frame 12 are allocated.

The structure of the energy dissipating metal plate 101 of the Example 2 is described. The energy dissipating metal plate 101 is a single steel plate with a configuration such that a first energy dissipating member 101A that joins the upper level vertical frame 17 and the floor joist 14 and a second energy dissipating member 101B that joins the floor joist 14 and the lower level vertical frame 12 are integrally connected at a connection part 101a. Meanwhile, reference symbols 176 denote a pair of reinforcement members.

The first energy dissipating member 101A joins the upper level vertical frame 17 and the floor joist 14 and exhibits energy dissipating performance corresponding to the relative displacement along the perpendicular direction between the upper level vertical frame 17 and the floor joist 14. The first energy dissipating member 101A is provided with: a second joint part 147 joined with the upper level vertical frame 17; a first joint part 146 joined with the floor joist 14; and damping parts 148 (vibration dissipating parts) which are provided on a transmission path of tensile force and compression force between the first joint part 146 and the second joint part 147, and which have a plurality of slits 165 formed therein. Each of the first joint part 146 and the second joint part 147 is a strip form substantially parallel with the direction of the relative displacement A.

A pair of the damping parts 148 is arranged adjacent to both sides of the second joint part 147. A pair of extension parts 150 that extend along the direction of the relative displacement A at both outer sides of the damping parts 148 are further provided. Furthermore, the first joint part 146 is provided along the direction of the relative displacement A so as to continue to both end parts of the extension parts 150. Meanwhile, the transmission path in the Example 2 is a path that connects the second joint parts 147, the damping parts 148, the extension parts 150, and the first joint part 146.

The second joint part 147 is joined to the upper level vertical frame 17 by fixing fasteners (fastening members such as bolts, drill screws, screws, and nails) inserted into a plurality of fastener insertion holes formed in the second joint part 147 on the upper level vertical frame 17.

Moreover, the first joint part 146 is joined to the floor joist 14 by fixing fasteners (fastening members such as bolts, drill screws, screws, and nails) inserted into a plurality of fastener insertion holes formed in the first joint part 146 on the floor joist 14.

The second energy dissipating member 101B joins the floor joist 14 and the lower level vertical frame 12 to exhibit energy dissipating performance corresponding to the relative displacement along the perpendicular direction between the floor joist 14 and the lower level vertical frame 12. Meanwhile, the same constituents as those of the first energy dissipating member 101A are given the same reference symbols, for the following description.

The second energy dissipating member 101B is provided with: a second joint part 147 joined to the lower level vertical frame 12; a first joint part 146 joined to the floor joist 14; and damping parts 148 which are provided on a transmission path of tensile force and compression force between the first joint part 146 and the second joint part 147, and which have a plurality of slits 165 formed therein.

The second joint part 147 is joined to the lower level vertical frame 12 by fixing fasteners (fastening members such as bolts, drill screws, screws, and nails) inserted into a plurality of fastener insertion holes formed in the second joint part 147 on the lower level vertical frame 12.

The configurations of the second energy dissipating member 101B other than those described above are the same as those of the first energy dissipating member 101A, and therefore, the overlapping descriptions thereof are omitted.

In the Example 2, the upper level vertical frame 17 and the lower level vertical frame 12 correspond to the target member 43, and the floor joist 14 corresponds to the target member 42.

As shown in FIG. 9A, in the case where the building structure 4 vibrates along the direction of the relative displacement A, it is possible to obtain an operational advantage similar to that of the energy dissipating metal plate 1.

That is to say, in the case where load caused by a small to moderate earthquake or wind is loaded on the building structure 4, the energy dissipating metal plate 101 can function as a highly rigid joint metal member. As a result, without plastically deforming the energy dissipating metal plate 101, it is possible to exhibit resistive force within a range of the elastic deformation range thereof. Moreover, if a large earthquake occurs, the damping parts 148 in four locations receive a cyclic load of tensile stress and compression stress and are plasticized, and thereby, it is possible to exhibit the damping effect.

Figure 10A:
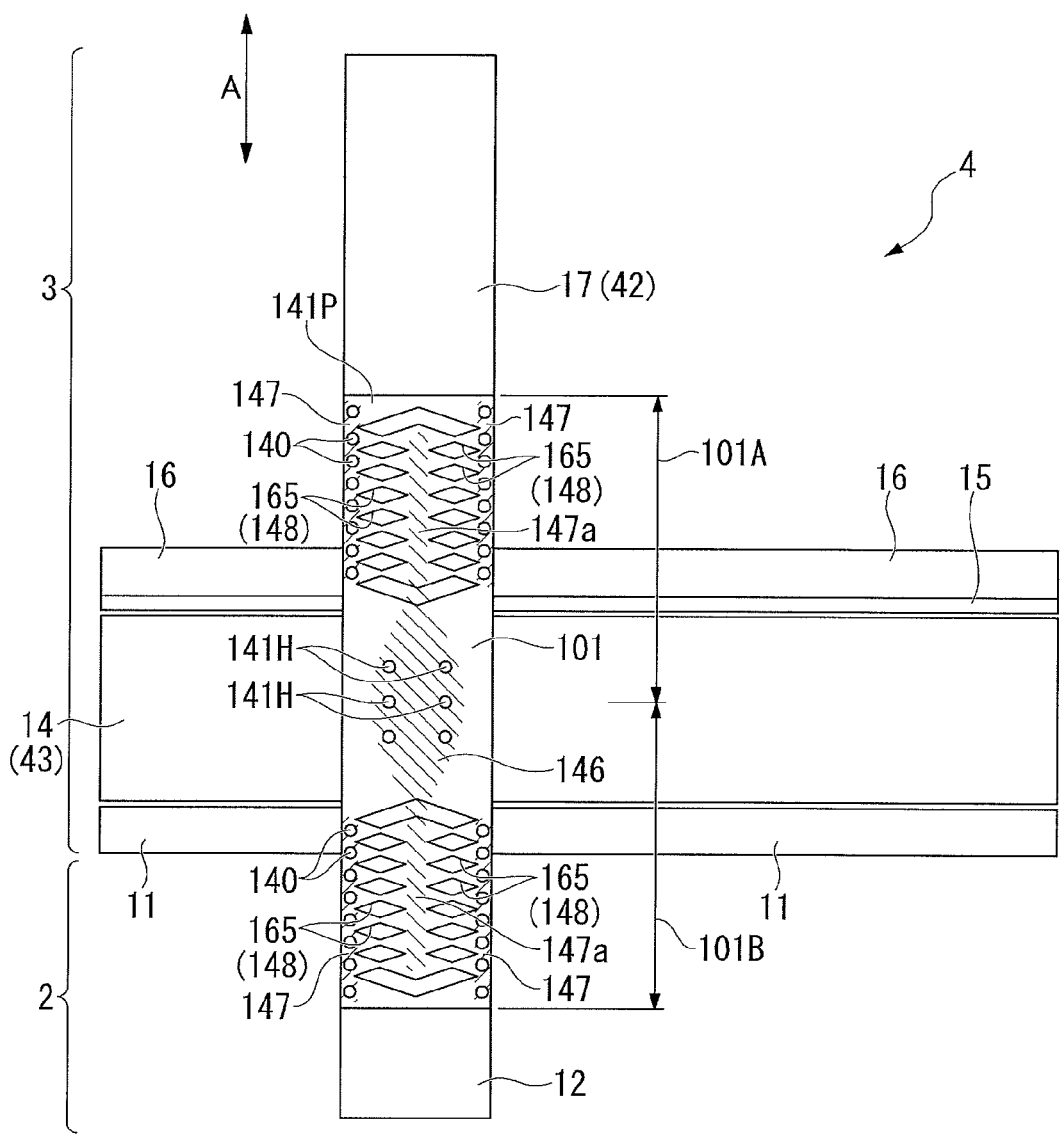
FIG. 10A is a side view showing another example of a building structure in which the energy dissipating metal plate of the present embodiment is arranged.

A modified example of the Example 2 is shown in FIG. 10A. Meanwhile, in the following description, points that differ from the configurations described with FIG. 9A are primarily described, and the rest of the configurations are treated as the same as those of FIG. 9A, therefore omitting overlapping descriptions.

In the first energy dissipating member 101A of the modified example, the second joint part 147 is arranged not between the damping parts 148 but on both outer sides of the respective damping parts 148. That is to say, no fastener insertion holes are formed between the respective damping parts 148, and instead, on both outer sides of the respective damping parts 148, there are formed a plurality of fastener insertion holes 140 in a strip form along the direction of the relative displacement A. By attaching the fasteners inserted in the fastener insertion holes 140 to the upper level vertical frame 17, the first energy dissipating member 101A is joined to the upper level vertical frame 17.

Moreover, the second energy dissipating member 101B also has a configuration similar to that of the first energy dissipating member 101A of the modified example.

The transmission path in the modified example in the above description is a path that connects the joint parts 147, the damping parts 148, and the first joint part 146, and it is possible to obtain an operational advantage similar to that of Example 2. In addition, in the case where the floor joist 14, which serves as the target member 43, is displaced along the direction of the relative displacement A, the stress based on the displacement can be directly transmitted to the region 147a between the damping parts 148.

Figure 10B:
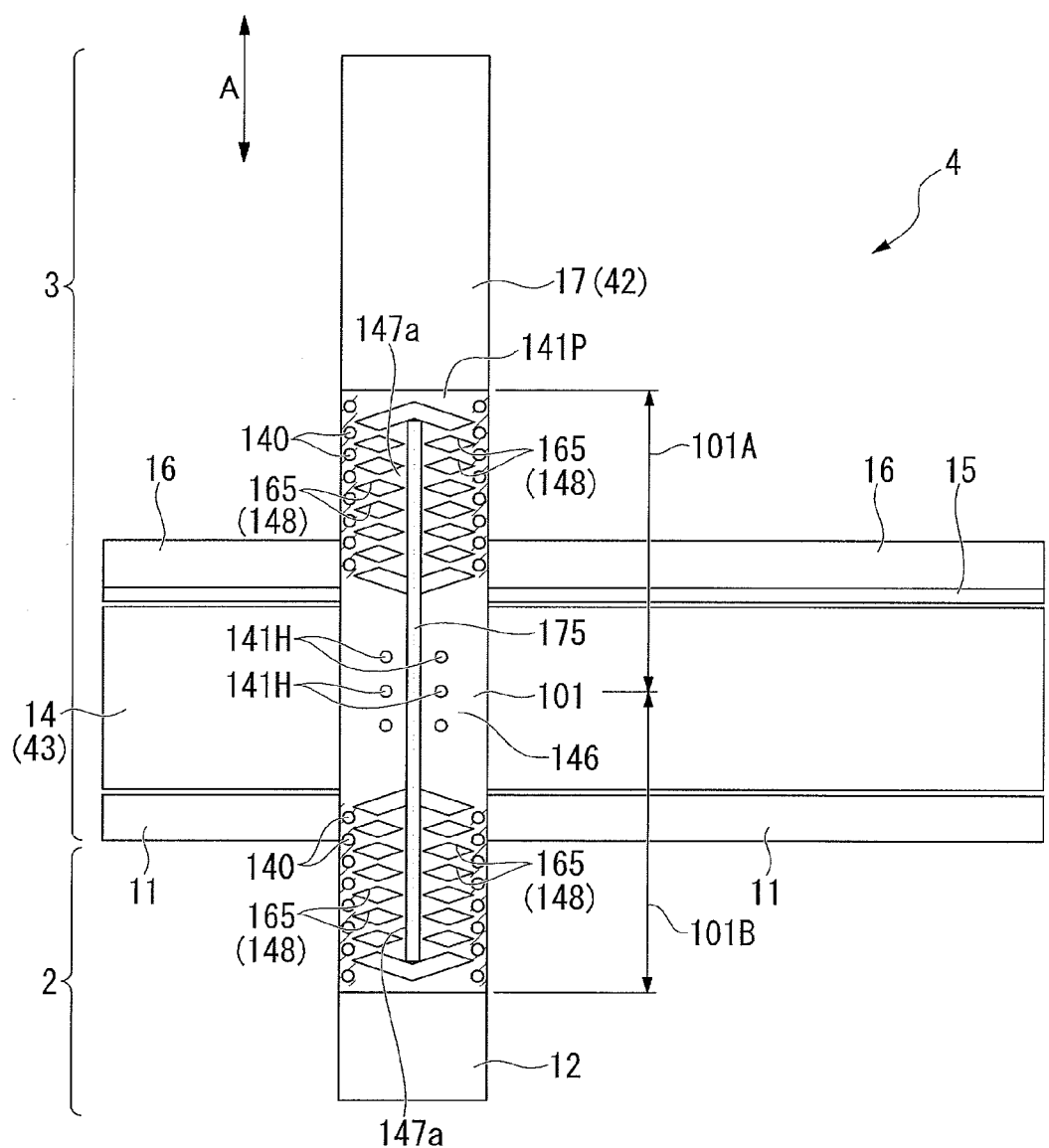
FIG. 10B is a side view showing still another example of a building structure in which the energy dissipating metal plate of the present embodiment is arranged.

Meanwhile, as shown in FIG. 10B, a reinforcement member 175 composed of a steel bar such as a rib may be further provided so as to be arranged through both of the region 147a between the damping parts 148 in the first energy dissipating member 101A and the region 147a between the damping parts 148 in the second energy dissipating member 101B, to thereby provide reinforcement. As a result, in the case where a small to moderate earthquake occurs or where load caused by wind is received, the energy dissipating metal plate 101 can function as a highly rigid strip metal material. As a result, without plastically deforming the energy dissipating metal plate 101, it is possible to improve resistive force within a range of the elastic deformation range thereof. Moreover, if a large earthquake occurs, the damping parts 148 are plasticized with respect to the cyclic load of tensile stress and compression stress as described above, and thereby, it is possible to exhibit the energy dissipating effect.

Example 3

Figure 11:
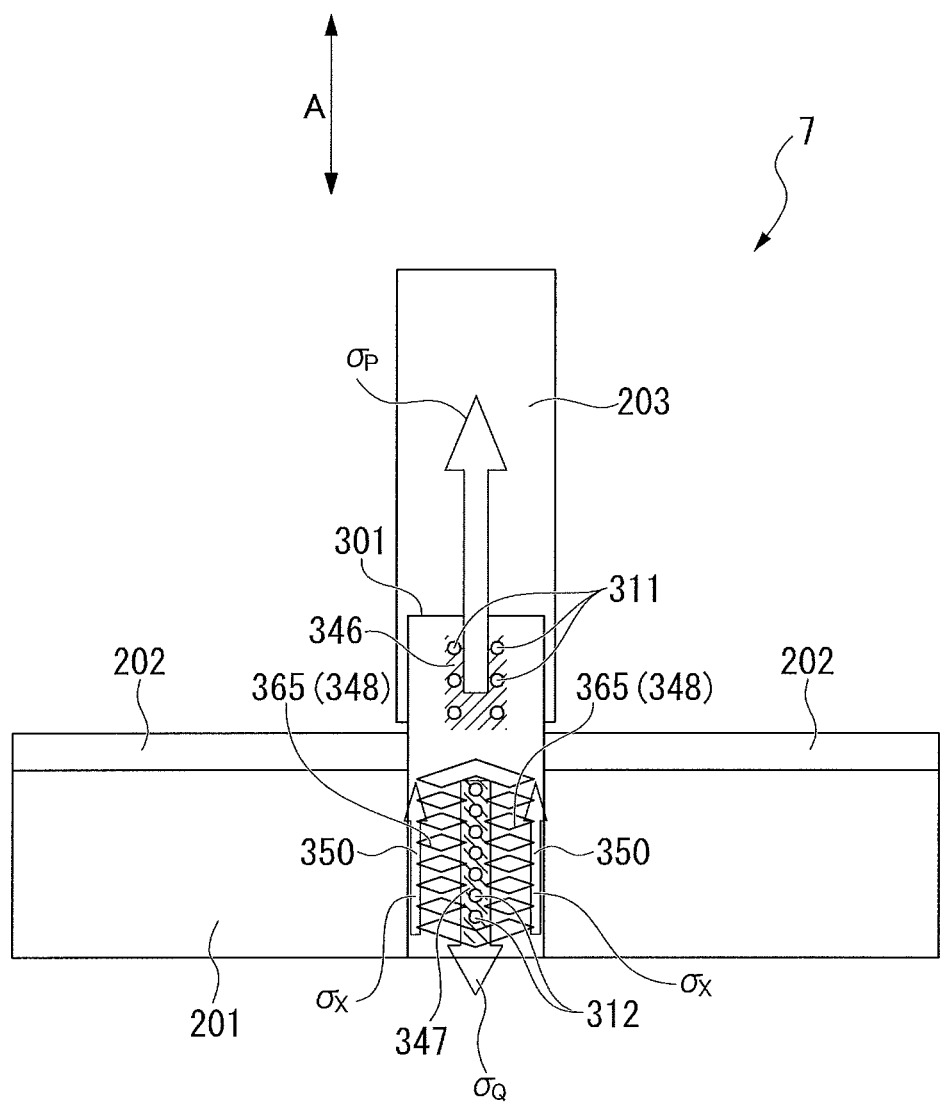
FIG. 11 is a side view showing still another example of a building structure in which the energy dissipating metal plate of the present embodiment is arranged.

FIG. 11 shows an example of a building structure 7 in which an energy dissipating metal plate 301 applied with the present invention is arranged, and more specifically, it shows an enlarged view of the vicinity of a beam 201 of the foundation of the building structure 7.

On the foundation side of the building structure 7, there are provided a beam 201 and a horizontal frame 202 that extend in the horizontal direction, and the beam 201 and the horizontal frame 202 are joined with each other. Moreover, there is further provided a vertical frame 203 that extends in the perpendicular direction from the horizontal frame 202 toward the upper level. The beam 201 and the vertical frame 203 are joined with each other via the energy dissipating metal plate 301.

The structure of the energy dissipating metal plate 301 of the Example 3 is described. The energy dissipating metal plate 301 joins the beam 201 and the vertical frame 203, to exhibit energy dissipating performance corresponding to the relative displacement along the perpendicular direction between the beam 201 and the vertical frame 203. The energy dissipating metal plate 301 is provided with: a second joint part 347 joined to the beam 201; a first joint part 346 joined with the vertical frame 203; and two lines of damping parts 348 (vibration dissipating parts) which are provided on a transmission path of tensile force and compression force between the first joint part 346 and the second joint part 347, and which have a plurality of slits 365 formed therein. Each of the first joint part 346 and the second joint part 347 is a strip form substantially parallel with the direction of the relative displacement A.

A pair of the damping parts 348 is arranged adjacent to both sides of the second joint part 347. A pair of extension parts 350 that extend along the direction of the relative displacement A at both outer sides of the damping parts 348 is further provided. Furthermore, the first joint part 346 is provided along the direction of the relative displacement A so as to continue to end parts of the extension parts 350. Meanwhile, the transmission path is a path that connects the second joint part 347, the damping parts 348, the extension parts 350, and the first joint part 346.

The second joint part 347 is joined with the beam 201 by fixing fasteners (fastening members such as bolts, drill screws, screws, and nails) inserted into a plurality of fastener insertion holes 312 formed in the second joint part 347 on the beam 201. On the other hand, the first joint part 346 is joined with the vertical frame 203 by fixing the fasteners, which are inserted in the plurality of fastener insertion holes 311 formed in the first joint part 346, onto the vertical frame 203.

Meanwhile, in the Example 3, the target member 42 with respect to the energy dissipating metal plate 301 corresponds to the vertical frame 203, and the target member 43 corresponds to the beam 201 of the foundation.

As shown in FIG. 11, at the location where the energy dissipating metal plate 301 is arranged in the building structure 7, if perpendicularly upward tensile load from the vertical frame 203 is loaded in the first joint part 346, stress $\sigma_P$ is loaded with respect to the first joint part 346. As a result, stress $\sigma_X$ is loaded to both of the outer sides of damping parts 348 in which the plurality of slits 365 are formed. Accordingly, shear stress occurs between the stress $\sigma_X$ and stress $\sigma_Q$ loaded on the second joint part 347, and as a result, bending moment based on the shear deformation is loaded on damping parts 348. When the bending moment becomes greater than a predetermined value, the energy dissipating metal plate 301 flexurally yields.

Example 4

Figure 12A:
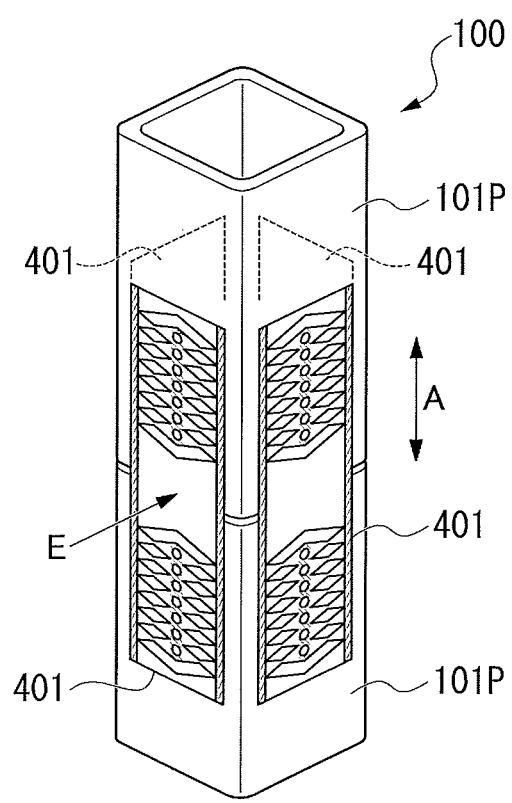
FIG. 12A is a figure showing still another example of a building structure in which the energy dissipating metal plate of the present embodiment is arranged, being a perspective view showing a state of being applied to a connection between steel pipe pillars.
Figure 12B:
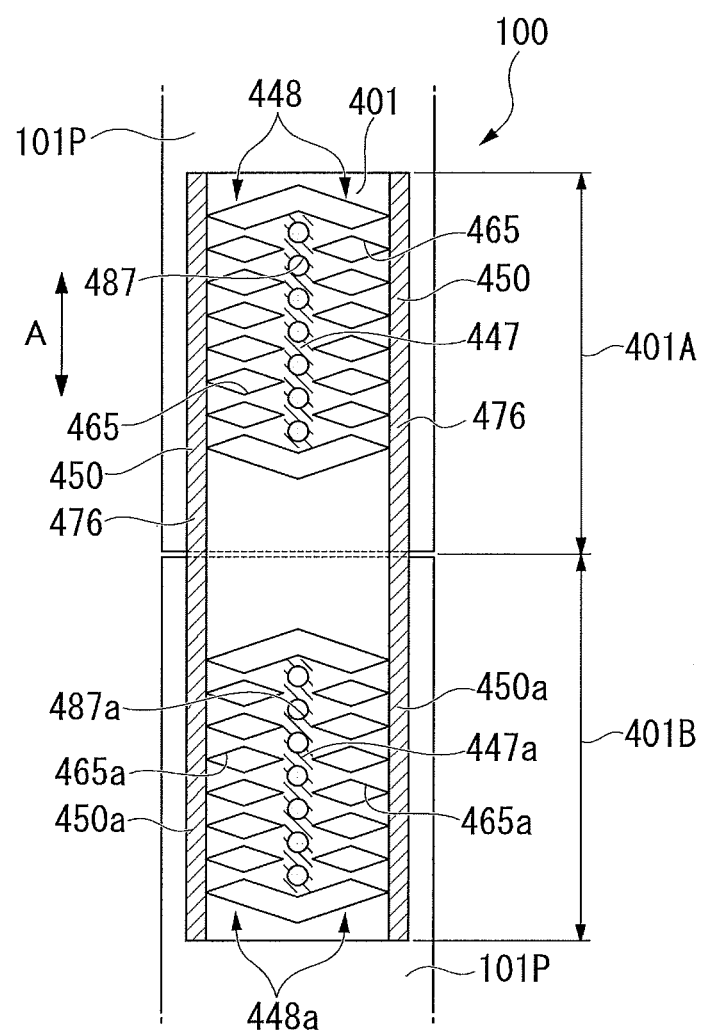
FIG. 12B is a side view seen from the E direction of FIG. 12A.

FIG. 12A and FIG. 12B show an example of a steel pipe pillar 100 in which energy dissipating metal plates 401 applied with the present invention are arranged. The steel pipe pillar 100 is configured such that a pair of steel pipes 101P having a square shape in section and a predetermined plate thickness is connected with each other with four of the energy dissipating metal plates 401. That is to say, a single energy dissipating metal plate 401 is provided on each of the four side faces of steel pipes 101P, and thereby the end parts of the steel pipes 101P are joined with each other.

The structure of the energy dissipating metal plate 401 of the Example 4 is described. The energy dissipating metal plate 401 is a single steel plate in which a first energy dissipating member 401A to be attached to one of the steel pipes 101P and a second energy dissipating member 401B to be attached to the other steel pipe 101P are integrally connected. Meanwhile, reference symbol 476 denotes a pair of strip-form reinforcement members (steel bars such as ribs).

The first energy dissipating member 401A is provided with: a first joint part 447 joined with the one steel pipe 101P; a pair of damping parts 448 (vibration dissipating parts) which are arranged on both sides of the first joint part 447 and which have a plurality of slits 465 formed therein; and extension parts 450 which extend from both of the outer sides of the damping parts 448 along the direction of the relative displacement A.

The second energy dissipating member 401B is provided with: a second joint part 447a joined with the other steel pipe 101P; a pair of damping parts 448a (vibration dissipating parts) which are arranged on both sides of the second joint part 447a and which have a plurality of slits 465a formed therein; and extension parts 450a which extend from both of the outer sides of the damping parts 448a along the direction of the relative displacement A.

The first energy dissipating member 401A and second energy dissipating member 401B form a single steel plate with their extension parts 450 being butted with each other. Meanwhile, the transmission path in the Example 4 is a path that connects the first joint part 447, the damping parts 448, the extension parts 450, the extension parts 450a, the damping parts 448a, and the second joint part 447a. Meanwhile, each of the first joint part 447 and the second joint part 447a is a strip form substantially parallel with the direction of the relative displacement A.

The first joint part 447 is joined to the one steel pipe 101P by fixing fasteners (fastening members such as bolts, drill screws, and screws) inserted into a plurality of fastener insertion holes 487 formed in the first joint part 447 on the one steel pipe 101P. Moreover, the second joint part 447a is joined with the other steel pipe 101P by fixing fasteners inserted into a plurality of fastener insertion holes 487a formed in the second joint part 447a on the other steel pipe 101P.

As a result, as shown in FIG. 12A and FIG. 12B, in the case where the steel pipes 101P vibrate along the direction of the relative displacement A, it is possible to exhibit the damage control effect.

That is to say, in the case where load caused by a small to moderate earthquake or wind is loaded on the steel pipe pillar 100, the four energy dissipating metal plates 401 can function as highly rigid joint metal members. As a result, without plastically deforming the energy dissipating metal plates 401, it is possible to exhibit resistive force within a range of the elastic deformation range thereof. Moreover, if a large earthquake occurs, the damping parts 448 and 448a receive a cyclic load of tensile stress and compression stress and are plasticized, and thereby, it is possible to exhibit the damping effect.

In the Example 4, since the energy dissipating metal plate 401 is provided on each face of the steel pipe 101P, the energy dissipating metal plate 401 exhibits the operational advantage described above with respect to vibrations of all directions that may occur to the steel pipe 101P, and it contributes to suppress vibration energy. However, the energy dissipating metal plate 401 may be attached only on some side faces rather than providing it on all of the four side faces of the steel pipe 101P. Moreover, in the Example 4, although an example of the case where the extension parts 450 are reinforced by the reinforcement members 476, the reinforcement members 476 may be omitted.

Example 5

Figure 12C:
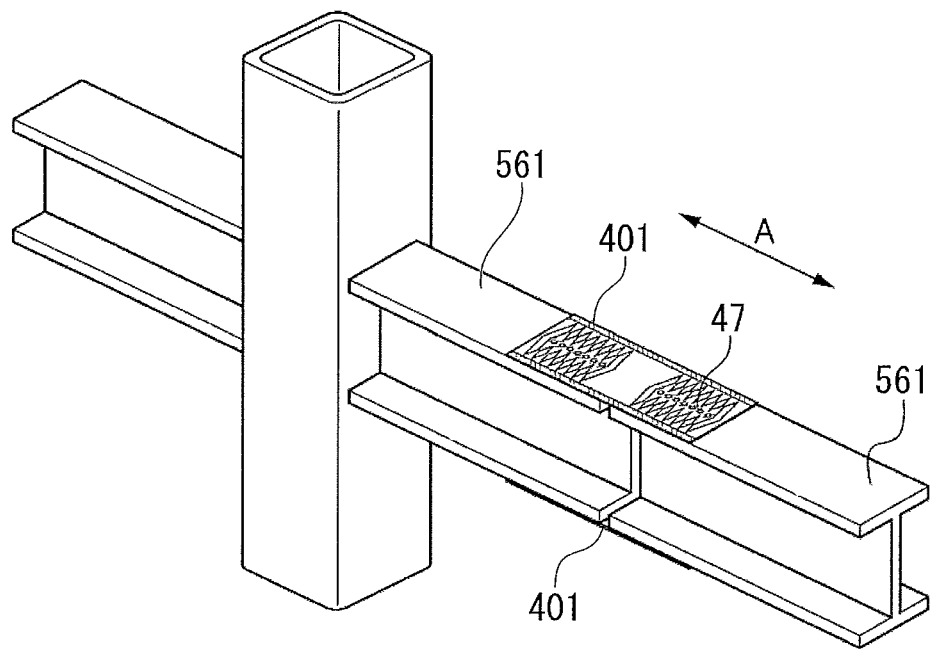
FIG. 12C is a figure showing still another example of a building structure in which the energy dissipating metal plate of the present embodiment is arranged, being a perspective view showing a state of being applied to a beam joint.

FIG. 12C shows an example in which two energy dissipating metal plates 401 described in Example 4 above are used for joining a pair of beams 561. The beams 561 are of a square shape in section or H shape in section and have a predetermined plate thickness, and interspace between a pair of beams 561 being adjacent to each other is connected.

The energy dissipating metal plates 401 are such that the first joint part 447 thereof is fixed on one of the beams 561 by fasteners (fastening members such as bolts, drill screws, and screws) while the second joint part 447a thereof is fixed on the other beam 561 by fasteners, to thereby connect the pair of beams 561.

As a result, in the case where the beams 561 vibrate along the direction of the relative displacement A as shown in FIG. 12C, it is possible to exhibit a damage control effect similar to that of Example 4.

In the Example 5, the energy dissipating metal plate 401 is provided on each of the upper and lower faces of the beams 561. As a result, the energy dissipating metal plate 401 exhibits the above operational advantage with respect to vibration of upwardly/downwardly bending directions that occur to the beams 561, to thereby contribute to suppress vibration energy. However, it is not limited to the configuration of providing the energy dissipating metal plate 401 on both of the upper and lower faces of the beams 561, and it may be attached only on one of the faces. Moreover, in the Example 5, although an example of the case where the extension parts 450 are reinforced by the reinforcement members 476, the reinforcement members 476 may be omitted.

Example 6

Figure 13:
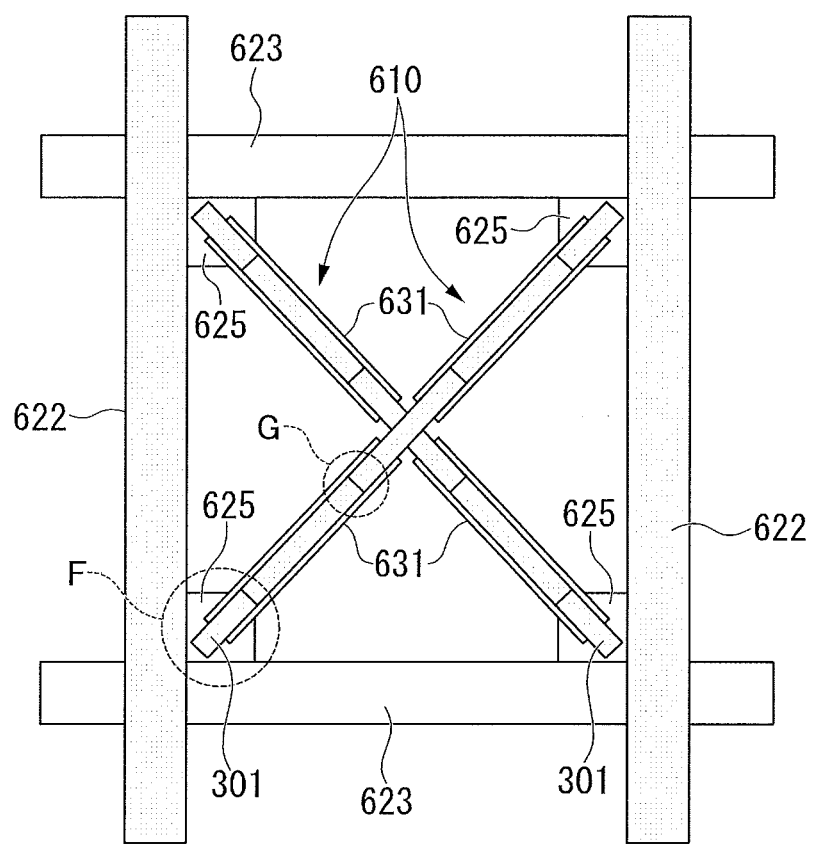
FIG. 13 is a figure showing still another example of a building structure in which the energy dissipating metal plate of the present embodiment is arranged, being a front view showing an example of an energy dissipating fuse.
Figure 14A:
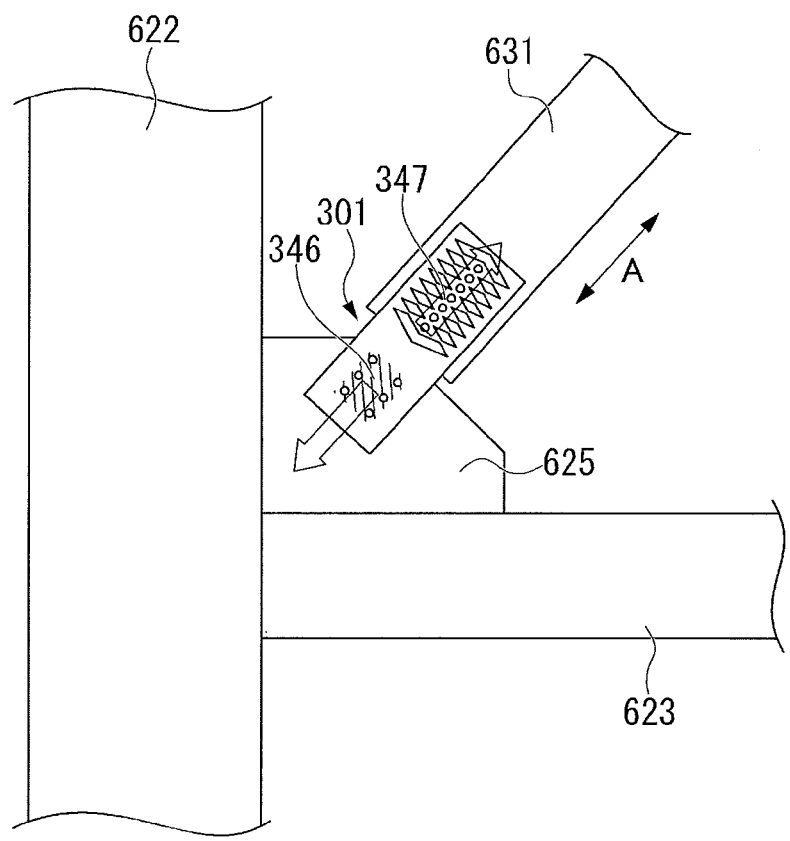
FIG. 14A is a figure showing a configuration of an attachment to the joint part on one end side of the energy dissipating fuse, being an enlarged view of part F in FIG. 13.
Figure 14B:
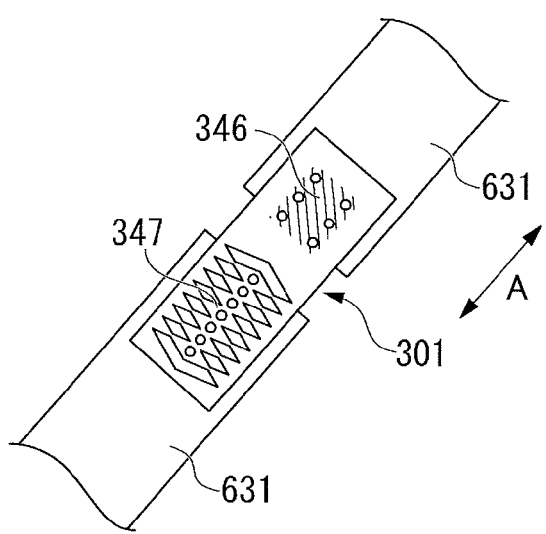
FIG. 14B is a figure showing a joint mode of the energy dissipating metal plate between adjacent braces, of the energy dissipating fuse, being an enlarged view of part G in FIG. 13.

FIG. 13 to FIG. 14B show an energy dissipating fuse 610 that uses the energy dissipating metal plates 301 of Example 3 described using FIG. 11.

The energy dissipating fuse 610 is arranged in an X shape along the diagonal lines of a square section formed with a pair of steel pipe pillars 622 and a pair of beams 623. At each intersection of each steel pipe pillar 622 and each beam 623, there is provided a joint member 625. The joint members 625 are respectively fixed strongly by means of welding or bolt joining.

One end of the energy dissipating fuse 610 is attached to any one of the joint members 625, and the other end is attached to a brace 631 of another energy dissipating fuse 610. FIG. 14A shows an attachment to the joint member 625 on one end side of the energy dissipating fuse 610. FIG. 14B shows joining of the energy dissipating metal plate 301 between the braces 631 adjacent to each other.

The energy dissipating fuse 610 is configured with a brace 631 and energy dissipating metal plates 301. That is to say, a single unit of the energy dissipating fuse 610 is configured with the brace 631 and the energy dissipating metal plates 301 connected to both ends thereof. In the mode shown in FIG. 14A, the first joint part 346 of the energy dissipating metal plate 301 is attached to the joint member 625, and the second joint part 347 is attached to the brace 631. In the case where vibration occurs along the direction of the relative displacement A, vibration energy dissipating is realized based on the mechanism described above.

On the other hand, in the joining locations between the braces 631, as shown in FIG. 14B, the second joint part 347 of the energy dissipating metal plate 301 is joined with one brace 631, and the first joint part 346 of the energy dissipating metal plate 301 is joined with the other brace 631. In the case where vibration occurs along the direction of the relative displacement A, vibration energy dissipating is realized based on the mechanism described above.

INDUSTRIAL APPLICABILITY

According to the present invention, it is possible to provide an energy dissipating metal plate which, in particular, can be arranged in an extremely narrow gap and which can be applied to various locations of a building structure, and a building structure which uses the energy dissipating metal plate.

REFERENCE SIGNS LIST 1, 101, 301, 401: Energy dissipating metal plate
4, 5, 7: Building structure
12: Lower level vertical frame (target member, wall frame)
14: Floor joist (target member)
17: Upper level vertical frame (target member, wall frame)
42, 43: Target member
46, 146, 346, 447: First joint part
46h: First insertion hole
47, 147, 347, 447a: Second joint part
48, 148, 348, 448: Damping part (vibration dissipating part)
49: Second insertion hole
65, 65a, 65b, 165, 365, 465: Slit
81: Continuous footing (target member)
82: Foundation (target member)
87: First fastener
88: Second fastener
101P: Steel pipe (target member)
150, 350: Extension part
175, 176: Reinforcement member
201: Beam (target member, beam material)
203: Vertical frame (target member, wall frame)
561: Beam (target member)
625: Joint member (target member)
631: Brace (target member)

The invention claimed is:

1. An energy dissipating metal plate which is a single flat metal plate, which joins a pair of members and which exhibits energy dissipating performance corresponding to a relative displacement between the members, the energy dissipating metal plate comprising:
  a pair of first joint parts to be joined to one of the members;
  a second joint part to be joined to the other of the members; and
  a pair of vibration dissipating parts having slits,
  wherein the pair of the first joint parts and the second joint part are formed in a strip shape substantially parallel to a direction of the relative displacement,
  the first joint parts are allocated in two lines in positions substantially line-symmetric with each other about the second joint part,
  the vibration dissipating parts are allocated in two lines in positions substantially line-symmetric with each other about the second joint part,
  one of the vibration dissipating parts is provided on a transmission path of a tensile force and a compression force between one of the first joint parts and the second joint part,
  the other of the vibration dissipating parts is provided on a transmission path of a tensile force and a compression force between the other of the first joint parts and the second joint part, and
  among the slits of the vibration dissipating parts, the slits positioned at both ends of the direction of the relative displacement are configured to be connected with each other and as being slits with a major axis thereof being along a direction which is substantially orthogonal to the direction of the relative displacement.

2. The energy dissipating metal plate according to claim 1, wherein the energy dissipating metal plate is the single flat metal plate to be located between the members so that a front surface comes in contact with the one of the members while a back surface comes in contact with the other of the members.

3. The energy dissipating metal plate according to claim 1, wherein: when seen along the direction of the relative displacement, lengths of the first joint parts are longer than a length of the second joint part; and end parts of the first joint parts in the form of the two lines are joined.

4. The energy dissipating metal plate according to claim 1, wherein the energy dissipating metal plate is precipitation-hardened or trip-processed so that a ratio of a yield proof stress to a maximum proof stress is equal to or more than 4/5.

5. The energy dissipating metal plate according to claim 1, wherein at least one of the first joint parts and the second joint part is reinforced along the direction of the relative displacement by a reinforcement member.

6. The energy dissipating metal plate according to claim 1, wherein:
  first insertion holes are formed in the first joint parts, while a second insertion hole is formed in the second joint part;
  first fasteners that join the first joint parts to the one of the members are inserted into the first insertion holes;
  a second fastener that joins the second joint part to the other of the members is inserted into the second insertion hole; and
  at least one of the first insertion holes and the second insertion hole is a hole which extends in a direction substantially orthogonal to the direction of the relative displacement.

7. The energy dissipating metal plate according to claim 1, wherein:
  each of the transmission paths is a path that connects the pair of the first joint parts and the second joint part via the vibration dissipating parts.

8. The energy dissipating metal plate according to claim 1, further comprising a pair of extension parts, wherein:
  the pair of extension parts extend from an outer side of the vibration dissipating parts along the direction of the relative displacement;
  the first joint parts are provided so as to be continuous with the extension parts; and
  each of the transmission paths is a path that connects the second joint part, the vibration dissipating parts, the extension parts, and the first joint parts.

9. A building structure comprising the energy dissipating metal plate according to any one of claim 1 to claim 8.

10. The building structure according to claim 9, further comprising a continuous footing and a foundation of a building upper frame,
  wherein, in a state where the energy dissipating metal plate is located between the continuous footing and the foundation, the first joint parts are joined to either one of the continuous footing and the foundation, and the second joint part is joined to other of the continuous footing and the foundation.

11. The building structure according to claim 9, further comprising a wall frame and a beam of a floor,
  wherein, while the second joint parts are joined to the wall frame, the first joint part is joined to the beam.

12. The building structure according to claim 9, further comprising an energy dissipating fuse which is arranged within a section formed by a plurality of steel pipe pillars and which has a plurality of braces,
  wherein, the energy dissipating metal plate is provided at least one of a joint location between the steel pipe pillars and the braces and a joint location between the braces.

* * * * *

UNITED STATES PATENT AND TRADEMARK OFFICE
CERTIFICATE OF CORRECTION

Page 1 of 1

PATENT NO.       : 8,875,452 B2
APPLICATION NO.  : 13/703101
DATED            : November 4, 2014
INVENTOR(S)      : Yoshimichi Kawai et al.

It is certified that error appears in the above-identified patent and that said Letters Patent is hereby corrected as shown below:

In the Specification

Column 8, line 63, change "where stress is loaded" to -- where stress $-\sigma_H$ is loaded --.

Signed and Sealed this
Twelfth Day of May, 2015

Michelle K. Lee
*Director of the United States Patent and Trademark Office*